May 20, 1969 — H. W. NIEMI — 3,445,147
THRUST BEARING ASSEMBLY
Filed Dec. 15, 1966 — Sheet 1 of 2
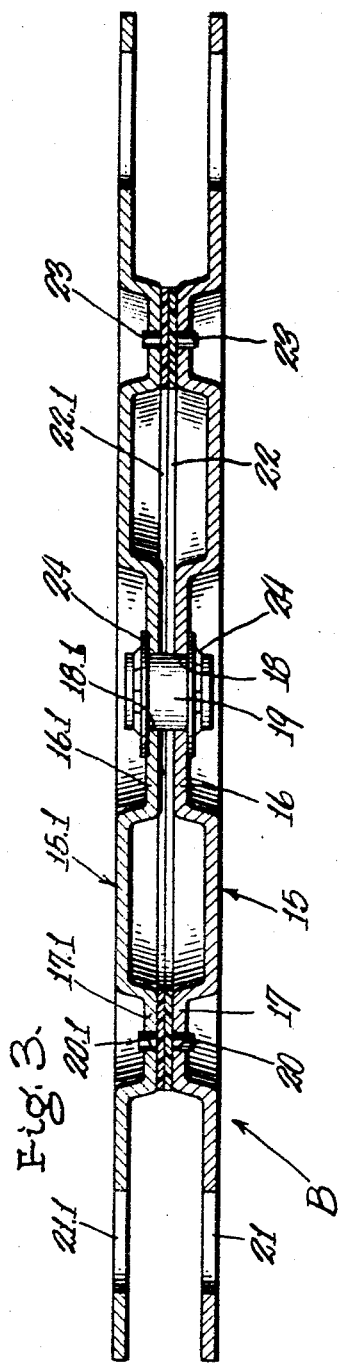
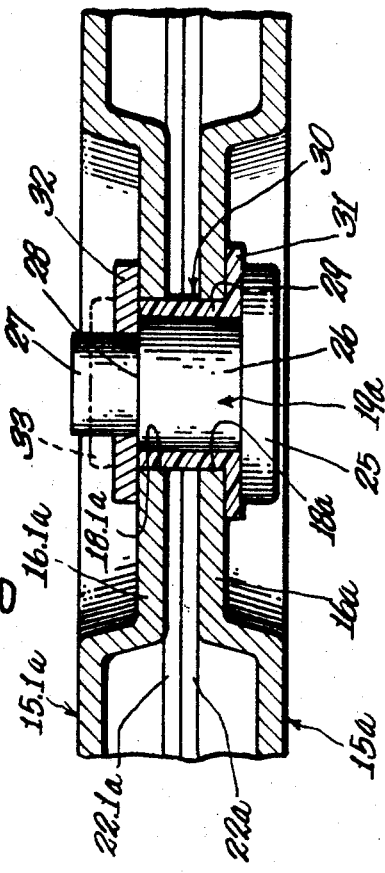
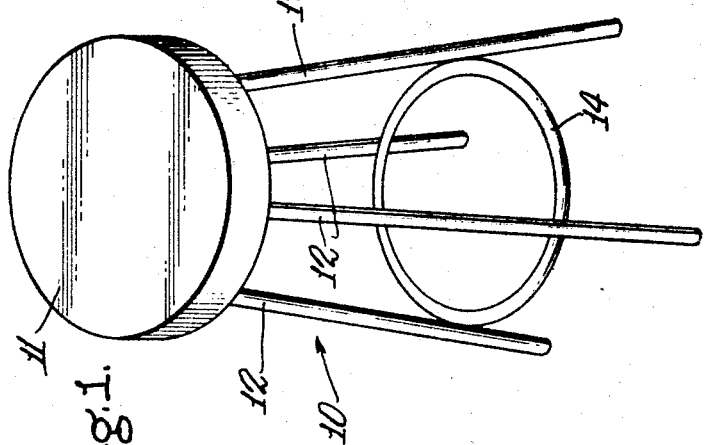
INVENTOR
HERBERT W. NIEMI
BY
Williams and Kreske
ATTORNEYS May 20, 1969 — H. W. NIEMI — 3,445,147

THRUST BEARING ASSEMBLY

Filed Dec. 15, 1966

INVENTOR.
HERBERT W. NIEMI
BY *Williams and Krauk*
ATTORNEYS

United States Patent Office 3,445,147
Patented May 20, 1969

3,445,147
THRUST BEARING ASSEMBLY
Herbert W. Niemi, New Middletown, Ohio, assignor to James K. Faull, Poland, Ohio
Continuation-in-part of application Ser. No. 479,080, Aug. 12, 1965. This application Dec. 15, 1966, Ser. No. 602,074
Int. Cl. F16c 17/04, 17/10, 19/04
U.S. Cl. 308—135                               7 Claims

ABSTRACT OF THE DISCLOSURE

This invention relates to the reduction of friction between a pair of pivoted-together metal members by the disposition of a low-friction plastic between the relatively moveable metal parts of the assembly.

---

Figure 4:
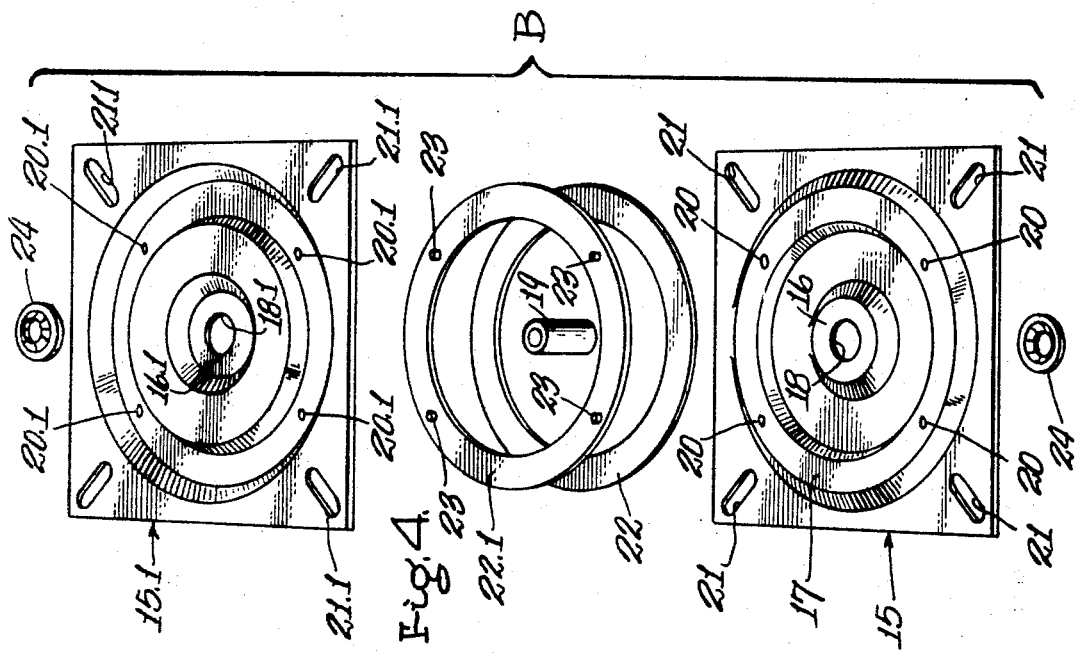

This application is a continuation-in-part of application Ser. No. 479,080, filed Aug. 12, 1965, now abandoned.

Preamble

Many products on the market today require the use of a thrust bearing assembly which provides for low-friction rotation between a pair of bodies. Some of these products, for example, are swivel chairs and stools, lazy Susans and television receivers. Heretofore, the foregoing and other products have used a thrust bearing which incorporated a number of ball bearings on which the thrust load was taken. In principle, such a ball thrust bearing is well-suited for these uses; however, as a practical matter, cost consideration have compelled the use of such low-cost bearings that they have not always been satisfactory. For example, after a period of time, the usual ball thrust bearing becomes noisy and erratic or sticky in operation even if it worked well when new. This is especially true when dust and dirt is allowed to accumulate on the bearing and/or when lubrication thereof is neglected. It should be noted that with the low-cost bearings here considered, no provision is made nor is there any necessity to retain lubricant therein or exclude foreign matter therefrom.

The present invention, provides a thrust bearing which, while lower in cost than conventional thrust bearings used for the purposes herein above mentioned, require no lubricant, is unaffected by dirt or dust and operates smoothly under all conditions. These and other advantages will readily become apparent from a study of the following description and from the drawings appended hereto.

Figure 2:
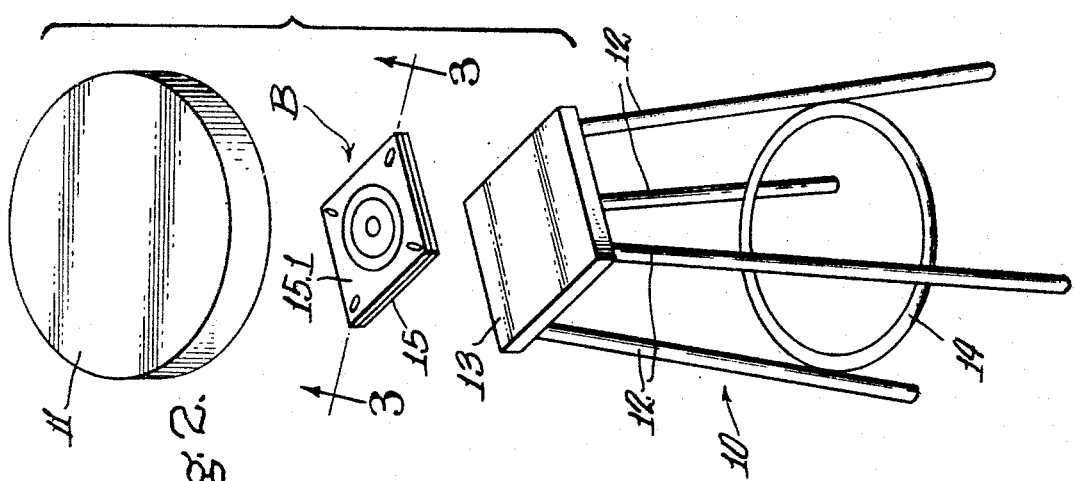

In the drawings accompanying this specification and forming a part of this application there is shown, for purpose of illustration, an embodiment which the invention may assume, and in these drawings:

FIGURE 1 is a perspective view of a common device which incorporates the present invention, FIGURE 2 is an exploded perspective view of the device seen in FIGURE 1 and illustrating the relationship of the present therewith, FIGURE 3 is an enlarged sectional view of the present invention generally corresponding to the line 3—3 of FIGURE 2, FIGURE 4 is a reduced size, exploded perspective view of the parts seen in FIGURE 3, and FIGURE 5 is an enlarged, fragmentary sectional view similar to FIGURE 3 but of another embodiment.

Detailed Description

With reference to FIGURE 1 wherein a conventional stool 10 having a rotatable seat 11 is shown, it is to be understood that the choice of a stool to illustrate the setting of the invention is not to be construed as a limitation in any respect since the invention may be used wherever two bodies are to be conected together for relative rotation.

Stool 10, and with reference also to FIGURE 2, comprises a plurality of legs 12 whose upper ends are secured to a base 13. The usual ring-like member 14 may be secured to intermediate portions of the legs 12 for bracing purposes. Intermediate the base 13 and the seat 11, and serving to rotatably connect such bodies together, is a thrust bearing assembly B which is the object of the present invention.

In brief, bearing assembly B comprises a pair of metal plates 15, 15.1 pivotally connected together in face-to-face relation for rotation about a central axis normal to the plane in which the plates are disposed. As hereinshown, the plates are disposed in a horizontal plane for rotation about a vertical axis. Upper plate 15.1 is adapted to be suitably secured to the underside of the seat 11 while the lower plate 15 is adapted to be suitable secured to the upper side of the base 13. With the seat and base secured to the bearing assembly B, it will be clear that they are pivotally connected together by the latter.

Turning now to the specific construction of the bearing assembly B and with reference to FIGURES 3 and 4, this assembly presently comprises the pair of metal plates 15, 15.1, previously mentioned and, since such plates are preferably identical, a description of plate 15 alone will suffice for both plates.

Plate 15 is herein shown to be generally square with a central, flat-topped, upwardly projecting boss 16 surrounded by an annular, flat-topped, upwardly projecting boss 17 concentric with the central boss 16. As best seen in FIGURE 4, the flat tops of bosses 16 and 17 preferably lie in the same plane, the boss 16 being apertured at 18 to closely receive a tubular pivot pin 19. At four circumferentially spaced places, the annular boss 17 is presently provided with apertures 20 for a purpose to appear and at the four corners of the plate, slots 21 are provided for passing suitable mounting bolts or the like (not shown) by means of which this plate is adapted to be secured to the previously mentioned stool base 13.

As hereinbefore stated, plate 15.1 is preferably identical to plate 15; accordingly, corresponding parts are identified by the same reference characters but with the ".1" suffix. Plate 15.1 is adapted to be superposed on plate 15 with the flat-topped surface of the boss 17.1 in face-to-face concentric relation with the flat-topped surface of the boss 17. Accordingly, plate 15 will be disposed so that its bosses 16.1, 17.1 project downwardly (in the position of parts shown) rather than upwardly as do the bosses 16, 17.

It is a primary object of the present invention to reduce friction between the bosses 17, 17.1 of the plates 15, 15.1 and as herein disclosed, this is effectuated by overlying respective boss flat surfaces with plastic disks 22, 22.1, respectively. Each disk presently has a plurality of structurally integral projections 23, see FIGURE 4, the projections on disk 22 closely fitting within apertures 20 of the plate 15 and the projections on the disk 22.1 closely fitting within the apertures 20.1 of the plate 15.1. As will be evident, the interfitting of the disk projections with the plate apertures as above described not only insures accurate location of a disk with its plate but also insures against relative rotation therebetween.

While many plastics may be suitable, it is preferable to form one of the disks from a plastic material known as acetal and the other from one known as nylon. Both of such materials have low-frictional characteristics and the use of dissimilar materials results in still lower friction than if the same materials were used for both disks. As stated, other plastics might well be used; for example, one or more of the fluorocarbons would prove suitable since such materials also have the requisite properties to a high degree. The fluorocarbons, however, are quite expensive and it is presently considered that their high cost makes them commercially unattractive.

In assembling the bearing structure, the plate 15 is assembled with its disk 22 and the plate 15.1 is assembled with its disk 22.1 as previously described. The plates are then disposed in the face-to-face relation shown in FIGURE 3 with the disks 22, 22.1 in abutment. The pivot pin 19 is then passed through the aligned apertures 18, 18.1 of respective plates and retained in position by internally toothed, spring washers 24 which are slid over respective pin ends to abutment with respective plates.

Preferably, washers 24 are pushed on to the pin with sufficient force that the two plate assemblies are tightly held together, the internal teeth on the washers biting into the pin 19 to prevent dissembly and the resilience of such washers resiliently holding the plate assemblies together despite manufacturing tolerances or wear caused by long use. It is to be noted in FIGURE 3 that with the parts assembled, the central plate bosses 16, 16.1 of respective plates are spaced apart from each other for friction reduction. Also, the spacing between bosses 16, 16.1 provides greater stability between the plates and the pivot pin because of the axial separation of the plate portions bearing upon the pivot pin.

With the bearing assembly completed as seen in FIGURE 3, the lower plate 15 may be secured, as herein illustrated to the base 13 of the stool by fastening members (not shown) passing through the plate slots 21. Similarly the upper plate 15.1 may be seured to the seat 11 of the stool by similar fastening members passing through the plate slots 21.1.

While the present invention is herein disclosed as being applied to a stool, it will readily be apparent that it may be used with many other devices and appliances wherein a low-friction bearing is required.

In the embodiment of FIGURE 5 wherein corresponding parts are identified with the same reference characters as before but with the suffix *a* added, friction during relative rotation of the plates 15a, 15.1a is even further reduced and a sturdier construction is provided by the following structure:

In this embodiment, the pivot pin 19a has an enlarged head 25 at one end of its shank portion 26 and a reduced diameter portion 27 at the other end of its shank. The juncture between shank 26 and end portion 27 provides a shoulder 28 later to be referred to. Closely but slidably fitting over the pin shank 26 is the main body portion 29 of a flanged bushing 30 preferably formed of one of the plastic materials previously mentioned. The flange 31 of bushing 30 is interposed between pin head 25 and the adjacent surface of the plate 15a as shown. The external diameter of the bushing main body portion 29 is of a size to closely but slidably fit within the plate apertures 18a, 18.1a while the length of the bushing is such that it termintes substantially in the plane of the upper (in the position of parts shown) surface of the plate boss 16.1a. The previously mentioned pin shoulder 28 is so located longitudinally of the pin 19a that it too lies in the aforesaid plane. Closely encircling the pin portion 27 is an apertured metal washer 32 which abuts the adjoining surface of plate 15.1a.

In order to secure the parts aforesaid together, that part of pin portion 27 which projects beyond the washer 32 is upset as shown in dotted lines to provide a shoulder 33 overlying the adjoining face of the washer. With pin portion 27 upset, washer 32 will be closely clamped to the pin shoulder 28, the adjoining end of the bushing 30, and the adjoining face of plate 15.1a.

With the parts thus assembled, pin 19a could turn with either plate 15a, 15.1a upon relative plate rotation. However, since relatively high friction will exist between the washer 32 and the adjoining plate 15.1a, between the bushing 30 and the pin 19a, and since the washer 32 will be staked to and structurally integrated with the pin by the above-described upsetting operation, the entire pin, washer and bushing assembly will rotate with the plate 15.1a and relative to the plate 15a.

In view of the foregoing it will be apparent to those skilled in the art that I have accomplished at least the principal object of my invention and it will also be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that my invention is not limited thereto.

I claim:

1. An anti-friction swivel structure, comprising a pair of plate-like members having flat surfaces in confronting relation,
    a pivot shaft extending between said members and providing an axis about which said members are relatively rotatable,
    radially enlarged, axially spaced shoulders carried by said pivot shaft and confining said plate members therebetween to retain them against separation, one of said shoulders comprising an internally toothed, annular washer of spring-like material frictionally engaged with said pivot shaft,
    and a plastic body encircling said pivot shaft and interposed between and separating said member flat surfaces from interengagement.

2. An anti-friction swivel structure, comprising a pair of plate-like members having flat surfaces in confronting relation,
    a pivot shaft having a shank portion extending between said plate-like members and providing an axis about which said members are relatively rotatable,
    radially enlarged, axially spaced shoulders carried by said pivot shaft and confining said plate members therebetween to retain them against separation,
    a sleeve of low-friction material interposed in the radial space between said shank portion and one of said plate-like members, said sleeve having an integral, radially enlarged flange interposed between said one member and the adjoining shaft shoulder aforesaid,
    and a plastic body encircling said pivot shaft and interposed between and separating said member flat surfaces from interengagement.

3. The construction of claim 1 wherein each of said shoulders comprises an internally toothed, annular washer of spring-like material frictionally engaged with said pivot shaft.

4. The construction of claim 2 wherein one of said shaft shoulders is provided by a head formed integrally with said shaft.

5. The construction of claim 4 wherein said shaft head is at one end of said shaft shank portion,
    wherein said shaft has a reduced diameter portion at the other end of its shank,
    wherein an apertured washer is disposed on said shaft reduced-diameter portion,
    wherein said shaft reduced-diameter portion is upset over said washer to retain it assembled with said shaft,
    and wherein said sleeve flange is interposed between said shaft head and the adjoining plate member.

6. The construction of claim 2 wherein each plate member has a plane thrust surface concentric with and spaced radially outwardly of said pivot axis,
    wherein respective thrust surfaces aforesaid are in facing relation,
    wherein a pair of plastic bodies each in the form of a thin annular ring are interposed between said thrust surfaces, wherein said plastic bodies are of the type having low-friction compatability without the use of lubricants, and wherein each plastic body has a pair of structurally intergral projections closely fitting within respective apertures formed in a respective plate member thrust surface and preventing relative movement between said plastic bodies and respective adjoining plate members.

7. The construction of claim 2 wherein said plastic body is in the form of a ring having large inside and outside diameters and small in width, the ring inside diameter being at least double the diameter of said pivot shaft shank portion so that a narrow but large anti-friction annulus is provided between said members, and wherein two projections are rigidly carried by said ring and closely fit within respective recesses formed in one of said members, said projections being spaced from each other circumferentially of said ring and said projections cooperating with respective recesses to locate and maintain said ring in concentric relation with said pivot shaft and prevent relative rotation between said ring and said one member.

References Cited

UNITED STATES PATENTS

| | | | |
|---|---|---|---|
| 1,999,949 | 4/1935 | Yawman | 308—165 |
| 2,759,773 | 8/1956 | Wilmer et al. | |
| 3,031,202 | 4/1962 | Melton et al. | 308—238 |
| 3,141,909 | 7/1964 | Mayo | 308—135 |
| 3,243,236 | 3/1966 | Graham. | |
| 1,143,142 | 6/1915 | Sams | 308—165 |
| 2,062,807 | 12/1936 | Cramer | 308—227 |
| 3,075,816 | 1/1963 | Harris et al. | 308—135 |
| 3,275,390 | 9/1966 | Franks | 308—136 |
| 3,337,277 | 8/1967 | Arnold | 308—136 |

FOREIGN PATENTS

| | | |
|---|---|---|
| 1,240,143 | 6/1960 | France. |
| 550,721 | 1/1943 | Great Britain. |

MARTIN P. SCHWADRON, *Primary Examiner*

F. SUSKO, *Assistant Examiner*.